US 8,413,429 B2

(12) United States Patent
Gioannini et al.

(10) Patent No.: US 8,413,429 B2
(45) Date of Patent: Apr. 9, 2013

(54) METHOD FOR DETERMINING THE AMOUNT OF PARTICULATE ACCUMULATED IN A PARTICULATE FILTER

(75) Inventors: Alberto Gioannini, Orbassano (IT); Marco Tonetti, Orbassano (IT)

(73) Assignee: C.R.F. Societa Consorile per Azioni, Orbassano (IT)

( * ) Notice: Subject to any disclaimer, the term of this patent is extended or adjusted under 35 U.S.C. 154(b) by 615 days.

(21) Appl. No.: 12/491,175

(22) Filed: Jun. 24, 2009

(65) Prior Publication Data

US 2009/0320452 A1 Dec. 31, 2009

(30) Foreign Application Priority Data

Jun. 25, 2008 (EP) .................................. 08425448

(51) Int. Cl.
*F01N 3/00* (2006.01)
(52) U.S. Cl.
USPC ................... 60/295; 60/274; 60/297; 60/303
(58) Field of Classification Search ................ 60/274, 60/284–287, 295–301, 303, 311
See application file for complete search history.

(56) References Cited

U.S. PATENT DOCUMENTS

| | | | | |
|---|---|---|---|---|
| 5,287,698 A * | 2/1994 | Shinzawa et al. | ............... | 60/286 |
| 6,941,750 B2 * | 9/2005 | Boretto et al. | .................. | 60/297 |
| 7,065,960 B2 * | 6/2006 | Gioannini et al. | ............. | 60/295 |
| 7,159,392 B2 * | 1/2007 | Kondoh et al. | ................. | 60/297 |
| 7,254,940 B2 * | 8/2007 | Saitoh et al. | .................... | 60/295 |
| 7,263,825 B1 * | 9/2007 | Wills et al. | ....................... | 60/295 |
| 7,587,892 B2 * | 9/2009 | Dye et al. | ......................... | 60/295 |
| 7,603,252 B2 * | 10/2009 | Lee et al. | ....................... | 702/155 |
| 2007/0056271 A1 * | 3/2007 | Berryhill et al. | ................ | 60/297 |

(Continued)

FOREIGN PATENT DOCUMENTS

| EP | 1333165 B1 | 1/2005 |
|---|---|---|
| EP | 1762718 A2 | 3/2007 |

(Continued)

OTHER PUBLICATIONS

Kladopoulou, E. A. et al., "A Study Describing the Performance of Diesel Particulate Filters During Loading and Regeneration—A Lumped Parameter Model for Control Applications," SAE Transactions 112(4), No. 2003-01-0842, SAE World Congress, Society of Automotive Engineers, Inc., Detroit, Michigan, Mar. 3-6, 2003, pp. 647-668.

(Continued)

*Primary Examiner* — Thomas Denion
*Assistant Examiner* — Jesse Bogue
(74) *Attorney, Agent, or Firm* — Seed IP Law Group PLLC

(57) ABSTRACT

A method for determining the amount of particulate that has accumulated in a particulate filter, comprising calculating an amount of particulate that has accumulated in the particulate filter on the basis of a physical model that uses measured and/or determined physical quantities, and subjecting the calculated particulate amount to validation on the basis of given validation criteria, the latter step envisaging validation of the calculated particulate amount in the case where said criteria are satisfied, and validation of a substitutive particulate amount which is a function of a previously validated amount and of an admissible rate of variation in the case where said criteria are not satisfied.

25 Claims, 8 Drawing Sheets

U.S. PATENT DOCUMENTS

| | | | |
|---|---|---|---|
| 2007/0130923 A1* | 6/2007 | Dye et al. | 60/295 |
| 2008/0010971 A1* | 1/2008 | Gioannini et al. | 60/274 |
| 2008/0184696 A1* | 8/2008 | Wyatt | 60/286 |
| 2008/0264039 A1* | 10/2008 | Lattin et al. | 60/285 |

FOREIGN PATENT DOCUMENTS

| | | |
|---|---|---|
| FR | 2862342 A1 | 5/2005 |
| FR | 2888617 A1 | 1/2007 |
| FR | 2902467 A1 | 12/2007 |
| JP | 2004-019529 | 1/2004 |
| JP | 2005-307880 | 11/2005 |

OTHER PUBLICATIONS

Konstandopoulos A. G. et al., "Fundamental Studies of Diesel Particulate Filters: Transient Loading, Regeneration and Ageing," SAE Transactions 109(4), No. 2000-01-1016, SAE World Congress, Society of Automotive Engineers, Inc., Detroit, Michigan, Mar. 6-9, 2000, pp. 683-705.

* cited by examiner

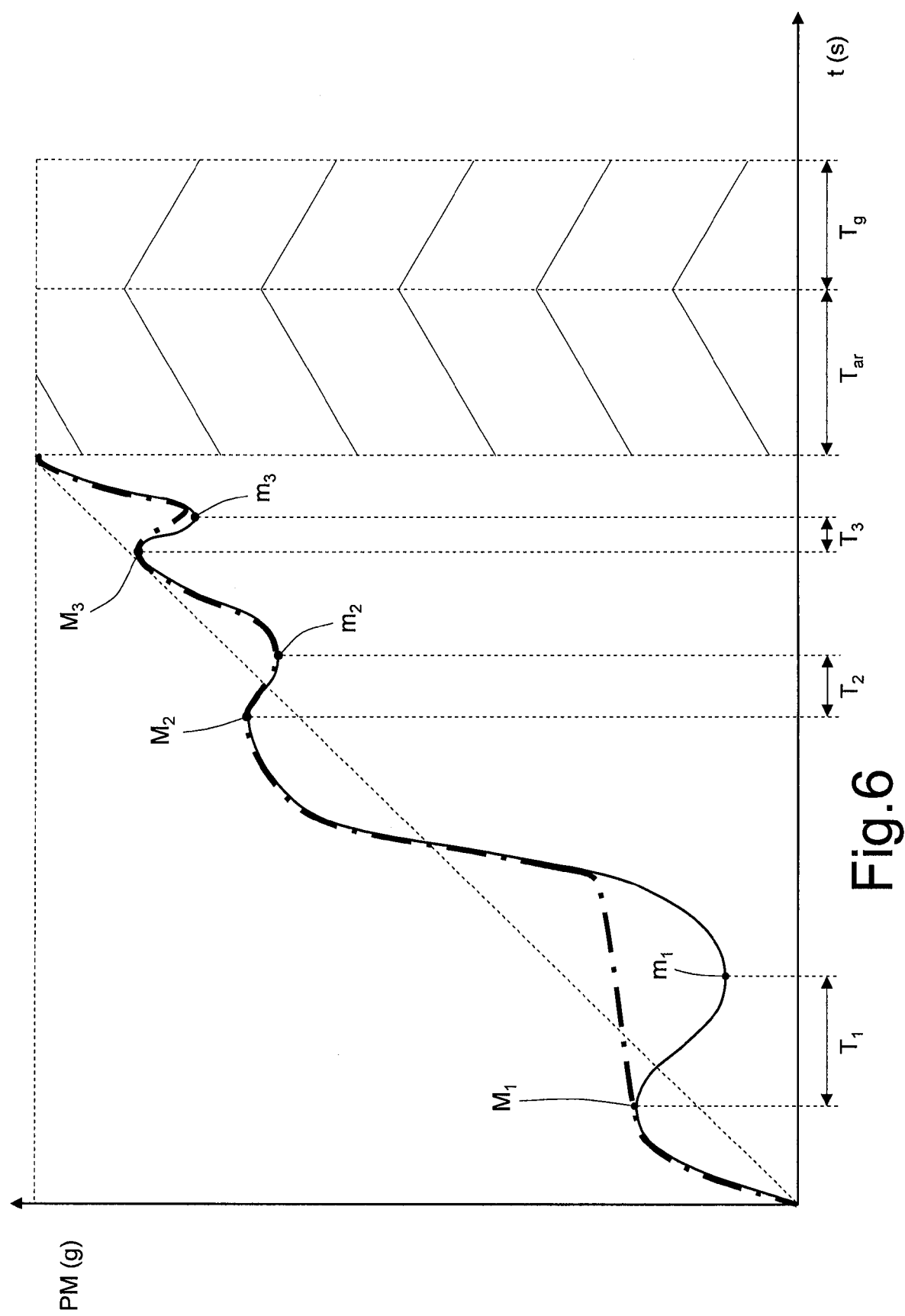

METHOD FOR DETERMINING THE AMOUNT OF PARTICULATE ACCUMULATED IN A PARTICULATE FILTER

BACKGROUND

1. Technical Field

The present invention relates to a method for determining the amount of particulate that has accumulated in a particulate filter.

In particular, the present invention finds advantageous, though non-exclusive, application in the engine sector, particularly in internal-combustion engines of motor vehicles, and amongst these principally in diesel engines, to which the ensuing treatment will make explicit reference, without this implying any loss of generality.

Further applications of the present invention could be in fact also in fields other than the engine sector, for example, for filtering the particulate emitted by any type of system provided with particulate filters, for example, gas-oil burners for boilers, etc.

2. Description of the Related Art

As is known, diesel engines of motor vehicles emit exhaust gases that are highly pollutant, given that they contain nitrogen oxides (NOx) and particulate, i.e., unburnt particles constituted principally by carbon material. Precisely on account of the highly pollutant composition, numerous countries are introducing increasingly stringent limits to exhaust-gas emissions by internal-combustion engines in order to reduce atmospheric pollution. Consequently, the reduction of the particulate present in exhaust gases constitutes one of the targets required by future European standards on pollutant emissions (Euro5, Euro5+, and Euro6 standards).

Many are the methods up to now proposed for reducing the amount of particulate present in exhaust gases. Included amongst these methods is the use of a particulate filter, also known as particulate trap, which is generally combined to the use of an oxidizing catalytic converter, which is set upstream of the particulate filter and has the function of promoting complete oxidation of exhaust gases, converting unburnt hydrocarbons, nitrogen oxides, and carbon monoxide into dioxide carbon, water, and nitrogen. The functions of the oxidizing catalytic converter and of the particulate filter can be alternatively performed by a single component known as catalyzed particulate filter.

By way of example, represented schematically in FIG. 1, and designated as a whole by 21 is a system for discharge of the exhaust gases produced by an internal-combustion engine 22 of a motor vehicle (not illustrated), in particular a diesel engine. In the case in point, by way of non-limiting example, the internal-combustion engine 22 is of the supercharged type and comprises a turbosupercharger 23 formed by a compressor 24 set along an air-intake pipe 25 and by a turbine 26 coupled to the compressor 24 and set along an exhaust pipe 27.

The system for discharge of the gases 21 is provided with a system for post-treatment 21b of the exhaust gases, comprising a catalyzed particulate filter, i.e., comprising: an oxidizing catalytic converter 28, set along the exhaust pipe 27 in a position close to the turbosupercharger 23, and a particulate filter 29 set along the exhaust pipe 27, downstream of the oxidizing catalytic converter 28; and a further oxidizing catalytic converter 28b set along the exhaust pipe 27, upstream of the particulate filter 29.

The discharge system 21 is moreover provided with: an electronic-control system 31 comprising an airflow meter (debimeter) 32, set along the air-intake pipe 25 and generating an electrical signal indicating the flowrate of the air in the air-intake pipe 25 itself; a differential-pressure sensor 33 having a first input and a second input connected to the input and to the output, respectively, of the catalyzed particulate filter, and an output supplying an electrical signal indicating the drop in pressure across the catalyzed particulate filter; a first temperature sensor 34 set at output from the particulate filter 29 and supplying an electrical signal indicating the temperature of the exhaust gases at outlet from the particulate filter 29; a second temperature sensor 35 set on the inlet of the particulate filter 29 and supplying an electrical signal indicating the temperature of the exhaust gases at inlet of the particulate filter 29; an atmospheric-pressure sensor 36; and an electronic control unit 37 connected to the aforementioned sensors and configured for determining the amount of particulate that has accumulated in the particulate filter 29 and activating regeneration thereof upon onset of given conditions, for example, when the amount of particulate accumulated exceeds a pre-set threshold.

The particulate filter 29 has the function of mechanical barrier for the passage of the particulate and is in general constituted by parallel channels with porous walls and alternately obstructed. The obstructions force the exhaust gases to traverse the side walls of the channels so that the unburnt particles constituting the particulate are first withheld in the porosities of the side walls themselves and then, when the latter are completely filled, accumulate on the internal surfaces of the walls of the channels to form a porous layer. With the increase of the accumulation of particulate on the internal surfaces of the walls of the channels also the pressure drop on the particulate filter increases, and hence the counterpressure generated by the particulate filter itself. The particulate cannot hence be accumulated indefinitely because high accumulations cause:

deterioration of performance, drivability, and engine consumption, until even stalling of the engine may occur; and destruction of the particulate filter, in the case of self-ignition and uncontrolled combustion of the particulate; in fact, in the presence of high accumulations of particulate, and in particular driving conditions, there may be triggered phenomena of "critical" regeneration, consisting in sudden and uncontrolled combustion of the particulate, which is in turn responsible for the high temperatures that are generated within the particulate filter and the consequent damage to the particulate filter itself.

It is hence necessary to remove periodically the particulate trapped, performing the so-called "regeneration" of the particulate filter, i.e., proceed to removal of the particulate accumulated in the filter.

Generally, the regenerations can broadly speaking be distinguished into active regenerations, i.e., ones controlled by an electronic control unit, and spontaneous regenerations, i.e., ones triggered in an uncontrolled and unforeseeable way during a phase of accumulation, typically caused by the presence of high accumulations of nitrogen dioxide ($NO_2$).

During operation of an internal-combustion engine, it is hence possible to distinguish phases of accumulation, i.e., time intervals in which there is a progressive accumulation of particulate in the particulate filter and there is no active regeneration, at most spontaneous regenerations, and regeneration phases, i.e., time intervals in which active regeneration occurs and the amount of particulate accumulated in the particulate filter decreases.

In the engine sector, the active regeneration of the particulate filter is obtained by means of the combustion (oxidation) of the particulate accumulated, which, since it is made up prevalently of carbon, reacts with the oxygen present in the exhaust gases, being transformed into carbon monoxide (CO) and carbon dioxide ($CO_2$). However, this reaction occurs spontaneously only at temperatures higher than approximately 600° C., said thermal levels being much higher than those that are measured at input to the particulate filter in conditions of normal operation of the internal-combustion engine.

It is hence necessary that under certain conditions, for example when given levels of accumulation of particulate in the particulate filter are detected, the temperature of the exhaust gases at inlet to the particulate filter should be raised artificially until self-ignition of the combustion of the particulate is obtained, i.e., occurrence of the regeneration is obtained.

In internal-combustion engines provided with electronically controlled common-rail fuel-injection systems, the artificial rise in temperature of the exhaust gases is advantageously obtained by using a post injection of fuel performed in the cylinders of the internal-combustion engine following upon the main fuel injection. In particular, the post injection of fuel can be alternatively carried out either during the expansion phase, in such a way that the injected fuel will burn in the combustion chamber, thus raising the temperature of the exhaust gases produced by the internal-combustion engine, or else during the exhaust phase, in such a way that the injected fuel will not burn in the combustion chamber and will reach unburnt the oxidizing catalytic converter, thus giving rise to an exothermal reaction that raises the temperature of the exhaust gases produced by the internal-combustion engine.

Since accumulation of particulate within the particulate filter is a non-linear process, but rather depends upon the engine point, it is expedient for the regeneration to occur not periodically, for example, every 10,000 km, but according to the amount of particulate that has accumulated in the particulate filter in such a way that regeneration will occur when it is effectively necessary, with consequent optimization of the performance of the particulate filter and of the efficiency of the internal-combustion engine.

In order to determine the amount of particulate that has accumulated in the particulate filter, basically two types of models have been developed over time that are designed to estimate said amount and are to be implemented in electronic control units: statistical models and physical models.

The statistical models are based upon a collection, carried out infield and with experimental tests, of data regarding the performance of a plurality of particulate filters in a wide field of engine operating conditions, for example when it is idling, in conditions of city traffic, out-of-town traffic and motorway traffic, and in conditions of high torque and high power. The data gathered enable creation of a statistics of the accumulation of particulate within the particulate filter as the time and the engine point vary.

Said in-field collection of data makes it possible to map each individual engine point with a corresponding rate of accumulation of particulate inside the particulate filter, expressed as mass of particulate accumulated per unit time (PM[g/h]).

The amount of particulate that has accumulated in the particulate filter at a given instant is then obtained as summation of the products of the rates of accumulation for the various engine points and the time that has effectively elapsed in said engine points.

Physical models envisage, instead, calculation of the amount of particulate that has accumulated in the particulate filter on the basis of a set of data, such as the counterpressure of the particulate filter, i.e., the difference between the pressure downstream and the pressure upstream of the particulate filter, the volume flowrate of exhaust gases and the temperature of the exhaust gases.

The majority of known physical models are essentially based upon the hypotheses that the distribution of the particulate inside the channels of the particulate filter and the physico-chemical properties of the particulate itself will be uniform and constant as the engine point and the history of accumulation of the particulate vary.

For example, in Konstandopoulos A. G., Kostoglou M., Skaperdas E., Papaioannou E., Zarvalis D., and Kladopoulou E., "Fundamental Studies of diesel Particulate Filters: Transient Loading, Regeneration and Ageing", SAE 2000-01-1016, 2000, there is proposed, on the hypotheses of a uniform spatial distribution of the particulate inside the channels (both in an axial direction and in a radial direction), an analytical modeling of the particulate filter, which takes into account different factors, such as the geometrical characteristics of the particulate filter, the physical characteristics of the material of the filter, the characteristics of the particulate itself, etc., assuming their constancy as the engine point and the history of accumulation of the particulate vary.

On the basis of the considerations set forth in the document "Fundamental Studies of Diesel Particulate Filters: Transient Loading, Regeneration and Ageing", known in the literature is a physical model based upon the use of the following equation, which models the phenomenon of accumulation of particulate in a catalyzed particulate filter, i.e., a filter provided with a catalytic converter installed upstream of the particulate filter:

$$\Delta P_{DPF}\left(\frac{\Delta P_{DPF}}{2} + P_{atm}\right) = \tag{1}$$

$$\frac{\mu_o T^{\delta+1} R}{2 M_w} Q_m \frac{(H+w)^2}{V_{trap}} \cdot \cdot \left[\frac{w}{k_m H} - \frac{1}{4 k_s} \ln\left(1 - \frac{m_s}{\rho_s} \cdot \frac{1}{NLH^2}\right)\right] + +$$

$$\frac{4}{3} \frac{FL^2}{H^4} + \frac{4}{3} \frac{FL^2}{H^4}\left(1 - \frac{m_s}{\rho_s} \cdot \frac{1}{NLH^2}\right)^{-2}\Bigg] +$$

$$\frac{TR}{M_w} Q_m^2 \frac{(H+w)^4}{H^2 V_{trap}^2}\left[\frac{w}{4 k_m'} + 2\xi\left(\frac{L}{H}\right)^2\right] + + \frac{\mu_o T^{\delta+1} R}{2 M_w}$$

$$Q_m \frac{(H_{cat} + w_{cat})^2}{V_{cat}}\left[\frac{4}{3} \frac{FL_{cat}^2}{H_{cat}^4}\right]$$

where:
$V_{trap}$, H, L, N, w are the following geometrical properties of the particulate filter: volume; size of cells; length; number of open cells; thickness of the walls;
$k_m$, $k_m'$ are the following properties of the material of the particulate filter: linear and non-linear permeability;
$V_{cat}$, $H_{cat}$, $L_{cat}$, $w_{cat}$ are the following geometrical properties of the catalytic converter: volume; size of cells; length; thickness of the walls;
R, F, $\xi$ are the following constants: gas constant (8.314 J/(K·mol)); coefficient of friction of gases in square-section pipes (~28.454); inertial term (~3);
$P_{atm}$, $M_w$, T, $\mu_o$ are the following properties of the exhaust gases: absolute pressure downstream of the particulate filter (which can possibly be approximated with the atmospheric pressure); average molecular weight of the gas; temperature; viscosity factor;
$m_s$, $k_s$, $\rho_s$ are the following physico-chemical properties of the particulate: mass (unknown quantity); permeability; density; and $\Delta P_{DPF}$, $Q_m$ are the total drop in pressure on the particulate filter and the mass flowrate of the exhaust gases.

Implementation of the above equation at the level of the electronic control unit for determining the amount of the particulate $m_s$ that has accumulated in the particulate filter is particularly complex in so far as expressing and calculating the amount of the particulate $m_s$ as a function of the other variables requires a computational power well above that of the control units currently used in the automotive sector.

Even if said equation were implementable in the engine control unit, the results would be absolutely unsatisfactory. In fact, the present applicant has shown, with bench tests and on-vehicle tests, that both the hypotheses of uniform and constant distribution of the particulate inside the channels of the particulate filter and those of invariability of the physico-chemical properties of the particulate as the engine point and the history of accumulation of the particulate itself vary, render it impossible to perform a correct estimate of the amount of particulate accumulated in the particulate filter in real operating conditions. This is the reason why regeneration-control systems based upon the measurement of the flowrate of exhaust gases, of the temperature thereof, and of the drop in pressure of the particulate filter have never been used in the automotive sector.

An in-depth study, conducted by the present applicant in order to investigate the possibilities of definition of a modeling of the particulate filter that would be more reliable than the known ones and that would be at the same time effectively implementable on control units currently used in the automotive sector, is described in the European patent No. EP 1333165. In particular, the study conducted by the present applicant is founded upon the assumption that the hypothesis underlying the known models, whereby the distribution of the particulate inside the channels of the particulate filter and the physico-chemical properties of the particulate itself remain constant as the engine point and the history of accumulation vary, is erroneous.

Starting hence from the assumption that the distribution of the particulate inside the channels of the particulate filter and the physico-chemical properties of the particulate itself vary as the operating condition of the engine and of the history of accumulation vary, the study conducted by the present applicant has led to the definition of the equation given below that links together the drop in pressure on the particulate filter, the temperature and flowrate of the exhaust gases, and the amount of particulate that has accumulated in the particulate filter through four experimental operating parameters $\alpha$, $\beta$, $\gamma$, $\delta$:

$$\Delta P_{DPF} \cdot \left( \frac{\Delta P_{DPF}}{2} + P_{atm} \right) = T^{\delta+1} \cdot Q_m \cdot (\alpha + \beta \cdot m_S) + \gamma \cdot T \cdot Q_m^2 \quad (2)$$

where:
$\Delta P_{DPF}$, $P_{atm}$, T, $Q_m$ are respectively the drop in pressure on the particulate filter, the absolute pressure downstream of the particulate filter itself (which can be possibly approximated with the atmospheric one), the temperature and flowrate of the exhaust gases (the latter being calculable by summing the flowrate of air at inlet to the engine and the total amount of injected fuel);

$m_S$ is the amount of particulate that has accumulated in the particulate filter; and $\alpha$, $\beta$, $\gamma$, $\delta$ are the aforesaid experimental operating parameters.

The four experimental operating parameters $\alpha$, $\beta$, $\gamma$, $\delta$ are determined experimentally by carrying out a specific set of bench tests with engine in steady-state running conditions. In greater detail, $\alpha$, $\gamma$ depend upon the geometry of the oxidizing catalytic converter and of the particulate filter, as well as upon the properties of the material of the particulate filter itself such as porosity, pore size, etc.;

$\beta$ depends upon the geometry of the particulate filter and upon the spatial distribution of the particulate inside the channels, both in an axial direction and in a radial direction, and upon the physico-chemical properties (for example, density and permeability) of the particulate; and $\delta$ is the exponential term of the relation between the temperature of the exhaust gases and their viscosity; typically, said term is equal to 0.74.

Given Eq. (2), it is possible obtain the amount of particulate that has accumulated in the particulate filter by applying the following equation:

$$m_s = \frac{\Delta P_{DPF} \left( \frac{\Delta P_{DPF}}{2} + P_{atm} \right) - \gamma \cdot T \cdot Q_m^2}{T^{\delta+1} \cdot Q_m \cdot \beta} - \frac{\alpha}{\beta} \quad (3)$$

which can be implemented by an engine electronic control unit more easily than Eq. (1).

In detail, the operating parameter $\beta$ is not kept constant, but rather it is mapped as a function of the different engine operating conditions, i.e., as a function of particular stationary conditions of accumulation of the particulate. In greater detail, initially determined and stored in the form of a map are a plurality of reference values $\beta_{PDPF}$ of a parameter $\beta$ defining a relation between the amount of particulate $m_s$ that has accumulated in the particulate filter and the drop in pressure $\Delta P_{DPF}$ on the particulate filter itself, each of the reference values $\beta_{PDPF}$ being associated to a respective steady-state condition of operation of the engine in which particulate accumulates in the particulate filter itself. In a given operating condition of the engine, there is then determined an operating value $\beta_{MOD}$ of the parameter $\beta$ as a function of the reference value $\beta_{PDPF}$ of the parameter $\beta$ itself for the same steady-state operating condition of the engine, and the history of accumulation of particulate in the particulate filter, i.e., the history of the engine points in which the engine itself has worked in the period that has elapsed from the last regeneration. Said operating value $\beta_{MOD}$ of the parameter $\beta$ is used for calculating the amount of particulate that has accumulated in the particulate filter and triggering regeneration thereof.

Physical models enable estimation of the amount of particulate that has accumulated on the basis of known quantities, which are generally determined with the aid of sensors connected to an electronic control unit, such as air-intake flowrate sensors (debimeters), temperature sensors at input to the particulate filter, and differential pressure sensors, designed to measure the counterpressure generated by the particulate filter.

The aforementioned sensors may be subject to malfunctioning, both electrical (drifts, variations of offset and/or gain, etc.) and mechanical (clogging, accumulation of dirt, etc.), with the consequence that the measurements provided by them may be imprecise. In addition, any malfunctioning is difficult to diagnose so that it can happen that the estimation of the amount of particulate that has accumulated, in so far as it depends upon the measurements supplied by the sensors, is erroneous. In particular, in the case of overestimation, the regeneration would be activated even though there is no effective need therefor, causing a dilution of the oil for lubrication of the internal-combustion engine and a consequent risk as regards operation thereof.

In order to mitigate partially the above drawbacks, in the patent EP 1541829 filed in the name of the present applicant there is proposed a solution based upon a sort of hybrid model, implementing a threshold mechanism. According to this solution, in order to prevent possible errors in the estimates provided by a physical method from causing undue activation of regeneration, the estimates provided by the physical model are compared with a maximum value and a minimum value calculated on the basis of the estimates provided by the statistical model. In particular, the amount of particulate that has accumulated in the particulate filter calculated using the physical model is compared with a range of admissibility calculated using the statistical model. If the amount of particulate that has accumulated, calculated using the physical model, falls within the range of admissibility, then said amount of particulate that has accumulated is validated; otherwise, it is limited to the closer between the extreme values of the range of admissibility. The hybrid model guarantees that regeneration will not occur before a minimum or maximum kilometric interval has elapsed from the previous regeneration, thus preventing an excessive dilution of the lubricating oil.

However, even though they have proven to be effective in numerous practical situations, both the hybrid model and the physical model described previously present certain critical aspects in specific situations, such as turning-off of the engine, and spontaneous regenerations and deliberately interrupted active regenerations, during which they are unable to model the phenomenon of accumulation of particulate in the particulate filter in a sufficiently precise way.

BRIEF SUMMARY

The aim of the present invention is hence to provide a method for determining the amount of particulate that has accumulated in a particulate filter that will mitigate at least in part the drawbacks of the known art.

According to the present invention, a method for determining the amount of particulate that has accumulated in a particulate filter is provided, as defined in the annexed claims.

BRIEF DESCRIPTION OF THE SEVERAL VIEWS OF THE DRAWINGS

For a better understanding of the invention, embodiments thereof are now described, purely by way of non-limiting example and with reference to the attached drawings, wherein:

FIGS. 3-7 and 10 show implementing details of the method according to the present invention.

DETAILED DESCRIPTION

The present invention stems from the assumption that, during an accumulation step and in the absence of spontaneous regenerations, the amount of particulate that has accumulated in the particulate filter increases over time so that any estimate thereof must respect a law of minimum increment. In addition, in the case where during the accumulation step a spontaneous regeneration takes place, the amount of particulate that has accumulated in the particulate filter is reduced, but with a rate of reduction not higher than a maximum admissible rate. This further assumption is based on observations made by the present applicant, who has noted how, during a spontaneous regeneration, there generally occurs a decrease in the resistance to flow to which there does not correspond a real decrease in the amount of particulate.

Consequently, the present invention envisages broadly speaking:

calculating the amount of particulate that has accumulated in the particulate filter on the basis of a physical model that uses measured and/or determined physical quantities, in particular the counterpressure of the particulate filter, the volume flowrate of the exhaust gases through the particulate filter, and the resistance to the flow of the exhaust gases through the particulate filter, the latter quantity depending upon the two previous ones in the way described hereinafter; and, then, subjecting the calculated amount of particulate to a phase of validation on the basis of given validation criteria, said validation phase basically envisaging validation of the calculated amount of particulate in the case where said criteria are satisfied, and validation instead of a substitutive amount of particulate in the case where said criteria are not satisfied, in which said substitutive amount of particulate is a function of a previously validated amount and of a rate of variation, in the way that will emerge more clearly from the ensuing description.

Figure 1:
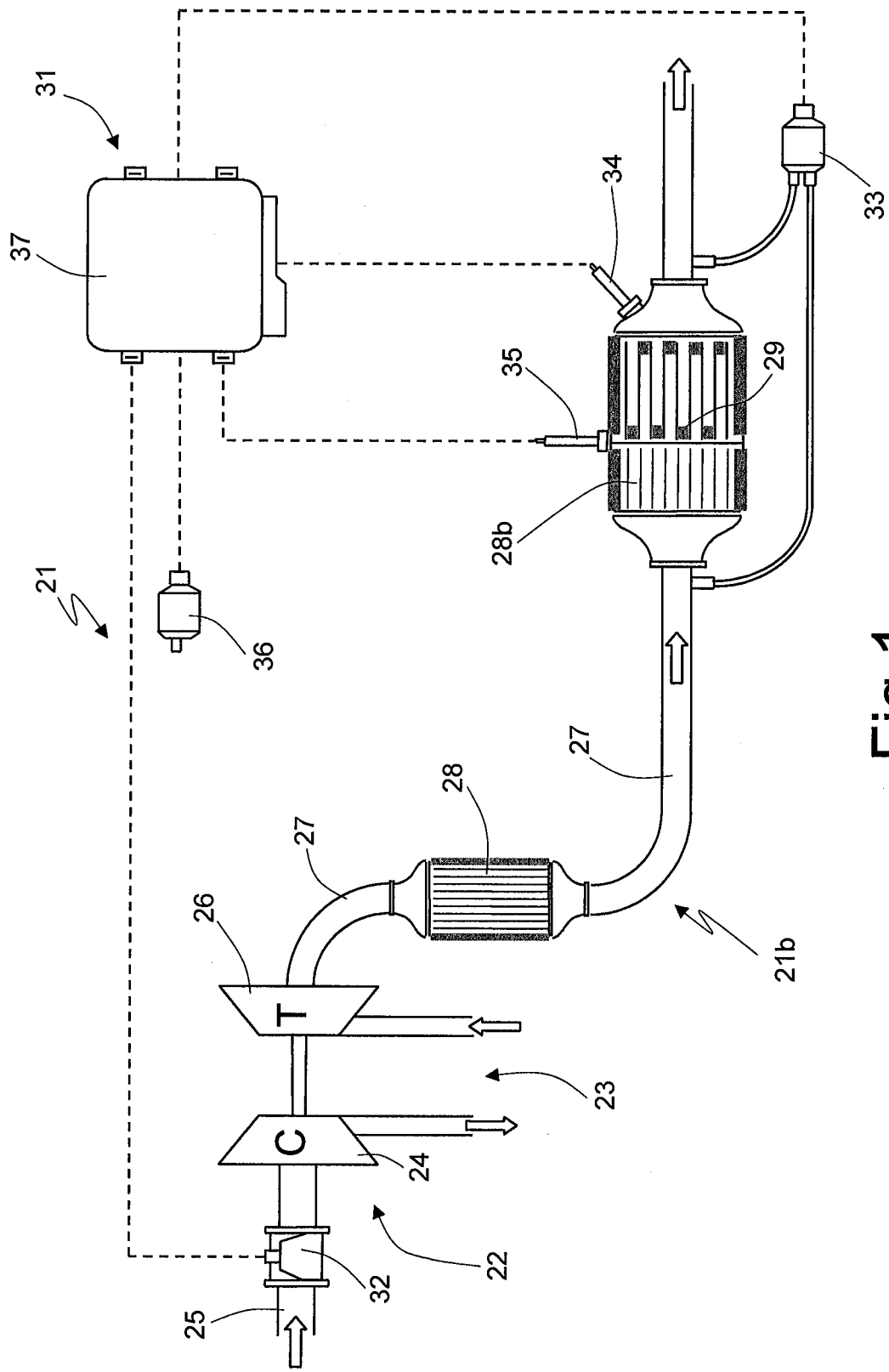
FIG. 1 is a schematic illustration of a system for discharge of the exhaust gases for an internal-combustion engine, said system being provided with a system for post-treatment of the exhaust gases.
Figure 2:
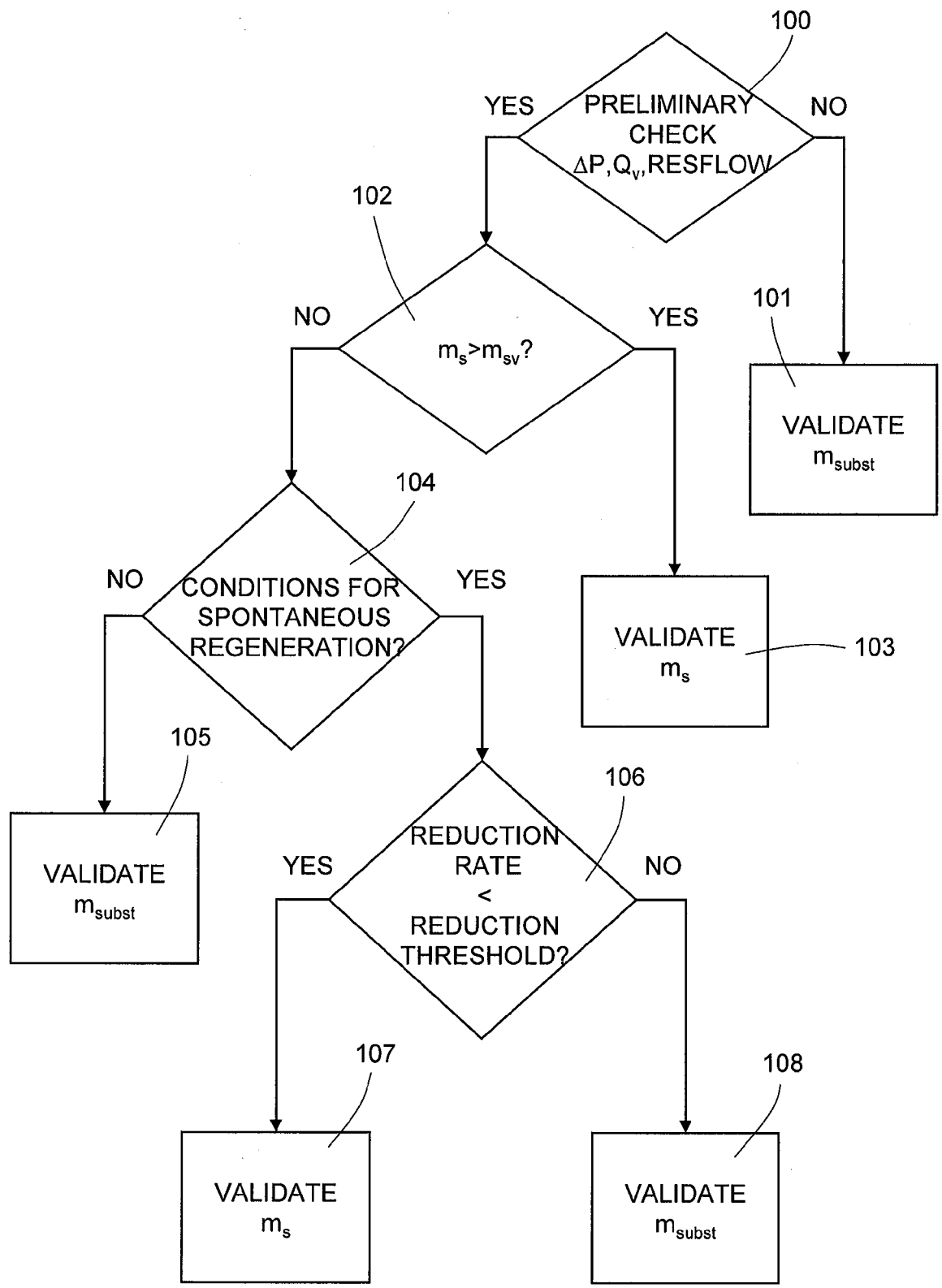
FIG. 2 shows a general flowchart regarding the method of validation of a calculated amount of particulate according to the present invention.
Figure 3A:
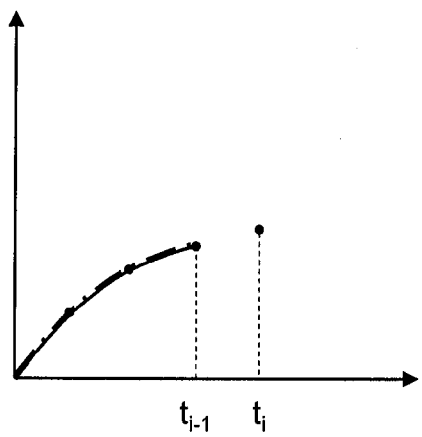
Figure 3B:
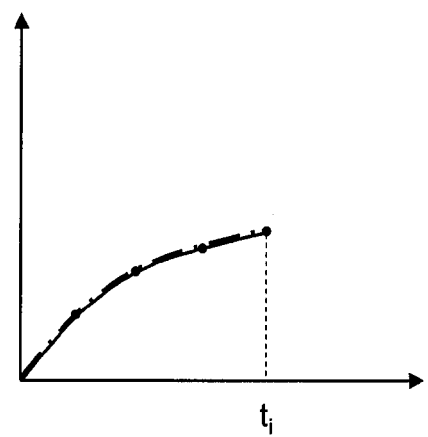

The present method is implemented by the electronic control unit provided for determining the amount of particulate that has accumulated in the particulate filter and for activating regeneration thereof, which operates on a discrete-time base and at each calculation step performs the operations described hereinafter with reference to FIG. 2 and to FIGS. 3-6, in which represented with a solid line are the plots of the calculated particulate amounts $m_s$, whilst represented with dashed-and-dotted lines are the plots of the validated particulate amounts $m_{sv}$.

In particular, the electronic control unit preliminarily checks (block 100) whether there are given operating conditions that cause the aforesaid measured and/or determined physical quantities, namely, the counterpressure $\Delta P$ of the particulate filter and the volume flowrate $Q_v$ and the resistance resflow to the flow of the exhaust gases through the particulate filter, depending upon which is the calculated particulate amount $m_s$, to be reliable. Specifically, said reliability is verified if the counterpressure $\Delta P$ of the particulate filter and the volume flowrate $Q_v$, and the resistance resflow to the flow of the exhaust gases through the particulate filter are greater than or equal to respective reliability thresholds defined in a step of calibration of the system.

In the case where said reliability is not found (block 101), then the calculated particulate amount $m_s$ is not validated, and in its place a substitutive particulate amount $m_{subst}$ is validated, obtained by incrementing the validated particulate amount $m_{sv}$ for the previous calculation step with a substitution increase rate $\Delta_+$ mapped as a function of the driving profile of the motor vehicle on which the discharge system is mounted.

In the case where, instead, said reliability is found, the electronic control unit checks (block 102) whether the calculated particulate amount $m_s$ is greater than or equal to the previous validated particulate amount $m_{sv}$.

If the calculated particulate amount $m_s$ is greater than or equal to the previous validated particulate amount $m_{sv}$ (see FIGS. 3a and 3b), this indicates an increase in the amount of particulate that has accumulated in the particulate filter during the accumulation step, therefore the calculated particulate amount $m_s$ is validated (block 103). If, instead, the calculated particulate amount $m_s$ is lower than the previous validated particulate amount $m_{sv}$, this indicates a reduction in the amount of particulate that has accumulated in the particulate filter during the accumulation, therefore the electronic control unit checks (block 104) whether there are operating conditions that could give rise to a spontaneous regeneration of the particulate filter, this being the only condition that could justify said reduction.

Figure 4A:
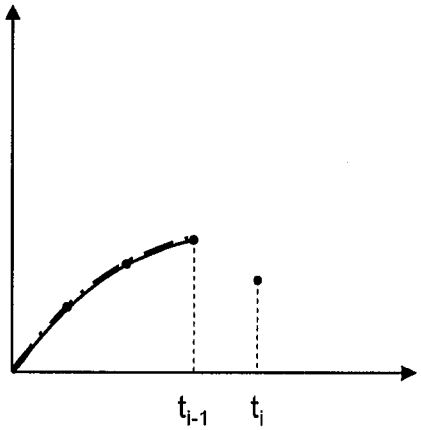
Figure 4B:
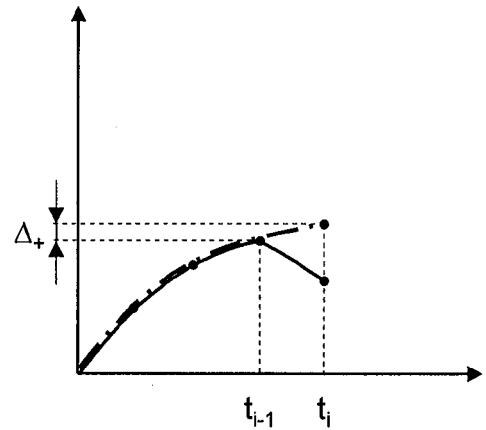
Figure 5A:
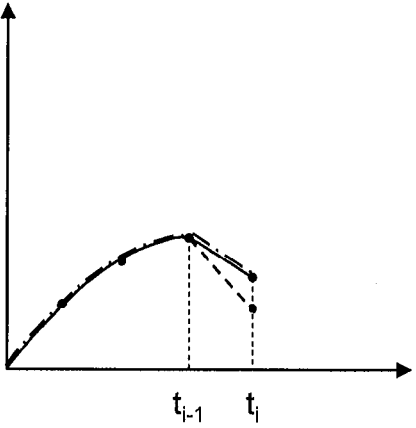
Figure 5B:
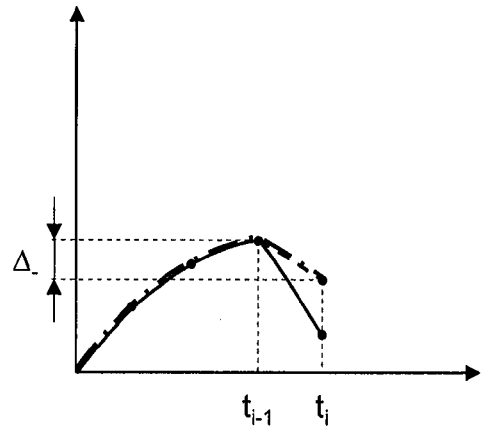

If said conditions do not obtain (see FIGS. 4a and 4b), the reduction of the calculated particulate amount is not due to a spontaneous regeneration of the particulate filter, therefore the calculated particulate amount $m_s$ is not validated, and in its place a substitutive particulate amount $m_{subst}$ is validated (block 105), obtained by incrementing the previous validated particulate amount $m_{sv}$ with a substitution increase rate, designated in FIG. 4b by $\Delta_+$, mapped as a function of the motor-vehicle driving profile, which is preferably the same as the one referred to previously.

Otherwise, if said conditions do obtain (see FIGS. 5a and 5b), the reduction in the calculated particulate amount could be due to a spontaneous regeneration of the particulate filter, therefore the electronic control unit checks (block 106) whether the rate of reduction of the calculated particulate amount is less than a given reduction threshold (represented with a dashed line). If it is (FIG. 5a), then the reduction of the calculated particulate amount is compatible with the one that can be obtained with a spontaneous regeneration of the particulate filter, therefore the calculated particulate amount $m_s$ is validated (block 107). If it is not, instead (FIG. 4b), the reduction of the calculated particulate amount is incompatible with the one that can be obtained with a spontaneous regeneration of the particulate filter, therefore the calculated particulate amount $m_s$ is not validated and in its place a substitutive particulate amount $m_{subst}$ is validated (block 108), obtained by decrementing the previous validated particulate amount $m_{sv}$ with a substitution reduction rate, designated in FIG. 5b by $\Delta$, less than the rate of reduction calculated and mapped as a function of the motor-vehicle driving profile, the temperature $T_{DPF}$ of the particulate filter, the volume flowrate $Q_v$ of the exhaust gases through the particulate filter, and the temperature $T_{CAT}$ of the catalytic converter.

During the accumulation step, at the end of the step of reduction of the calculated particulate amount $m_s$, i.e., when this starts to increase again, the validation process depends upon the conditions in which the reduction of the calculated particulate amount $m_s$ has occurred, namely:

if the reduction has occurred in the presence of operating conditions compatible with a spontaneous regeneration of the particulate filter and the rate of reduction of the calculated particulate amount was less than the reduction threshold, the electronic control unit continues validation of the calculated particulate amount $m_s$ because it is greater than or equal to the previous validated particulate amount $m_{sv}$; whereas if the reduction has occurred in the absence of operating conditions compatible with a spontaneous regeneration of the particulate filter, or else has occurred in the presence of operating conditions compatible with a spontaneous regeneration of the particulate filter, but the rate of reduction of the calculated particulate amount was higher than the reduction threshold, the electronic control unit continues validation of the substitutive particulate amount $m_{subst}$ until the calculated particulate amount $m_s$ returns to being greater than or equal to the validated particulate amount $m_{sv}$ for the previous calculation step.

FIG. 6 illustrates, by way of example, the validation process in the various situations described above. In particular, FIG. 6 illustrates the plots of the calculated particulate amounts $m_s$ (solid line), obtained by using the physical model, and of the corresponding validated particulate amounts $m_{sv}$ (dashed-and-dotted lines), obtained by applying a time-continuous version of the present method, i.e., assuming a calculation step of infinitesimal amplitude.

In particular, there may be noted the points $M_1$, $M_2$ and $M_3$ of local maximum of the calculated particulate amounts $m_s$, which are followed, respectively, by:

a time interval $T_1$, in which the calculated particulate amounts $m_s$ decrease, but there do not exist operating conditions compatible with a spontaneous regeneration of the particulate filter, therefore the calculated particulate amounts $m_s$ are not validated and in their place the substitutive particulate amounts $m_{subst}$ are validated, obtained by incrementing the previously validated amounts $m_{sv}$ with the substitution increase rate. This occurs as long as the calculated particulate amounts $m_s$ are less than the validated particulate amounts $m_{sv}$ for the previous calculation steps, and hence also after the point $m_1$ of local minimum has been reached, after which the calculated particulate amounts $m_s$ start to increase again;

a time interval $T_2$, in which the calculated particulate amounts $m_s$ decrease, and there are present operating conditions compatible with a spontaneous regeneration of the particulate filter, and the rate of reduction of the calculated particulate amounts $m_s$ is less than the reduction threshold, therefore the calculated particulate amounts $m_s$ are validated. This occurs also after the point $m_2$ of local minimum has been reached, because the calculated particulate amounts $m_s$ return to being greater than or equal to the validated particulate amounts $m_{sv}$ for the previous calculation steps; and a time interval $T_3$, in which the amounts of particulate $m_s$ calculated on the basis of the physical model decrease, there obtain operating conditions compatible with a spontaneous regeneration of the particulate filter, but the rate of reduction of the calculated particulate amounts $m_s$ is higher than the reduction threshold, therefore the calculated particulate amounts $m_s$ are not validated and in their place the substitutive particulate amounts $m_{subst}$ are validated, obtained by decrementing the previous validated particulate amounts $m_{sv}$ with the substitution reduction rate. This occurs as long as the calculated particulate amounts $m_s$ are less than the validated particulate amounts $m_{sv}$ for the previous calculation steps, and hence also after the point $m_3$ of local minimum has been reached, after which the calculated particulate amounts $m_s$ start to increase again.

FIG. 6 moreover illustrates a step of active regeneration of duration $T_{ar}$ and a subsequent initialization step $T_g$. During the active regenerations, according to the present method no amount is calculated or validated, since the data supplied by the sensors that equip the discharge system are considered temporarily unreliable. The control unit restarts execution of the validation method described only after a transient period represented by the initialization step $T_g$.

According to a different aspect of the present invention, which is irrespective of the validation method adopted, the physical model on the basis of which the amount of particulate that has accumulated in the particulate filter is calculated is modified in the way described hereinafter in order to improve significantly the performance thereof. In addition, when combined to the validation process described above, the new physical model advantageously enables a further increase in the reliability of the calculation of the amount of particulate that has accumulated in the particulate filter.

With reference to the previous Eq. (2), which defines the physical model on the basis of which the amount of particulate that has accumulated in the particulate filter is determined, this can be advantageously rewritten in the following compact form:

$$\Delta P = Q_v(\alpha + \beta \cdot m_s) + \gamma \cdot Q_v^2 \qquad (4)$$

where:
$\Delta P$ is the counterpressure of the particulate filter (expressed in millibar, mbar);
$Q_v$ is the volume flowrate of exhaust gases (expressed in cubic millimeters per hour, $mm^3/h$),
$m_s$ is the amount (mass) of particulate calculated on the basis of the physical model (expressed in grams, g); and
$\alpha, \beta, \gamma$ are appropriate calibration coefficients, which, albeit differing in value from those of Eq. (2), are designated by the same symbols by analogy of physical meaning, i.e., because they model the same physical phenomena.

The particulate amount $m_s$ can hence be calculated by applying the following equation:

$$m_s = \frac{\Delta P - \gamma \cdot Q_v^2}{Q_v \cdot \beta} - \frac{\alpha}{\beta} \qquad (5)$$

Experimental tests have shown that of the three calibration coefficients $\alpha$, $\beta$ and $\gamma$, the one that carries the most weight on the precision of the estimate of the particulate amount $m_s$ is the calibration coefficient $\beta$, which basically links the particulate amount $m_s$ to the counterpressure $\Delta P$ measured. Consequently, neglecting the dependency upon the geometry of the oxidizing catalytic converter and of the particulate filter and upon the properties of the material of the particulate filter itself such as porosity, pore size, etc., i.e., considering the calibration coefficients $\alpha$ and $\gamma$ as being negligible, the particulate amount $m_s$ can be computed by applying the following simplified equation that could be defined of a "point" type:

$$m_s = \frac{1}{\beta} \cdot \frac{\Delta P}{Q_v} = \frac{1}{\beta} \cdot resflow \qquad (6)$$

where resflow is the resistance to the flow of the exhaust gases through the particulate filter and is defined as the ratio between the counterpressure $\Delta P$ of the particulate filter and the volume flowrate $Q_v$ of exhaust gases through the particulate filter itself.

As has been said initially, the value of the calibration coefficient $\beta$ is not constant, but it is markedly affected by the amount of particulate that has accumulated in the particulate filter and by the motor-vehicle driving profile during the accumulation step, therefore it is not possible to approximate with just one value of the calibration coefficient $\beta$ all the possible modes of accumulation of the particulate in the particulate filter. In fact, described in detail in the aforesaid European patent EP 1333165 filed in the name of the present applicant is a method for calculating the value of the calibration coefficient $\beta$ based precisely upon the assumption that the distribution of the particulate inside the channels of the particulate filter and the physico-chemical properties of the particulate itself will vary as the operating condition of the engine and the history of accumulation of the particulate itself vary.

There exist, however, specific operating situations in which the link between the calibration coefficient $\beta$ and the resistance resflow to the flow of the exhaust gases through the particulate filter can undergo even significant alterations, in particular upon turning-off of the motor-vehicle engine (so-called parking effect, whereby upon restarting of the engine of the motor vehicle after a prolonged parking, the counterpressure $\Delta P$ of the particulate filter can assume a value even significantly different from, in particular, lower than, the value assumed before parking, which would lead to an underestimation of the amount of particulate that has accumulated in the particulate filter), spontaneous regenerations, and active regenerations (above all in the case of interrupted regenerations).

According to the present invention, instead, the history of accumulation of the particulate is taken in account via a physical model defined by the following equation, which could be defined of an "integral" type:

$$m_s = \int \frac{1}{\beta(t)} \cdot \frac{\partial}{\partial t} resflow \cdot dt \qquad (7)$$

where the lower limit of integration is represented, in steady-state conditions, by the final instant of the guard interval $T_g$, whilst the upper limit of integration is represented by the current instant of calculation of the amount of particulate that has accumulated.

In addition, the implementation of Eq. (7) requires the knowledge of an initial value or constant of integration, which represents the amount of particulate present in the particulate filter at the instant of start of the integration, in the example described above at the end of the aforesaid guard interval $T_g$; this value can be conveniently calculated using the previous point equation (6).

Figure 7A:
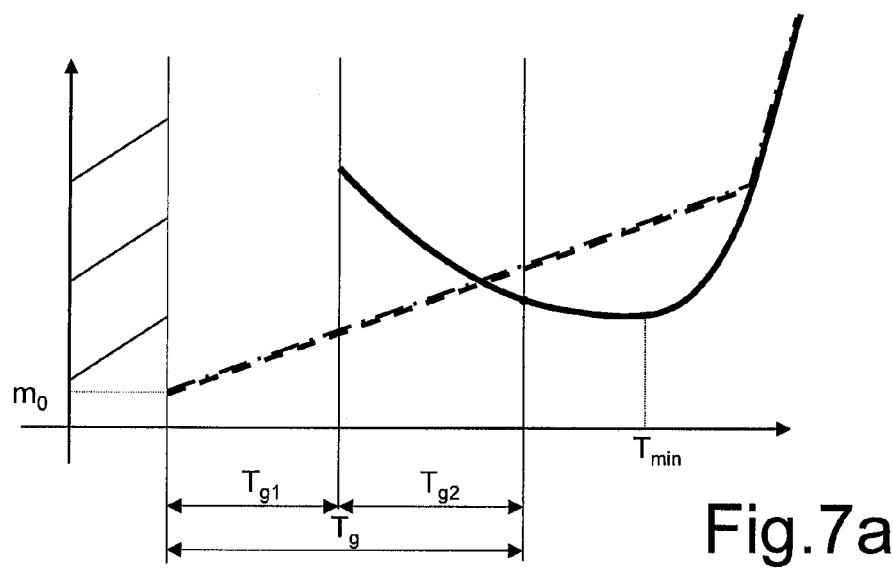
Figure 7B:
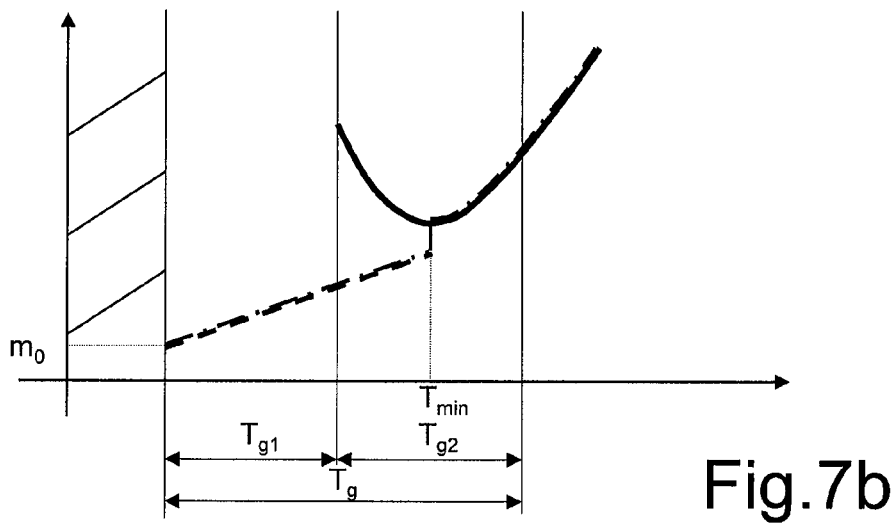
Figure 7C:
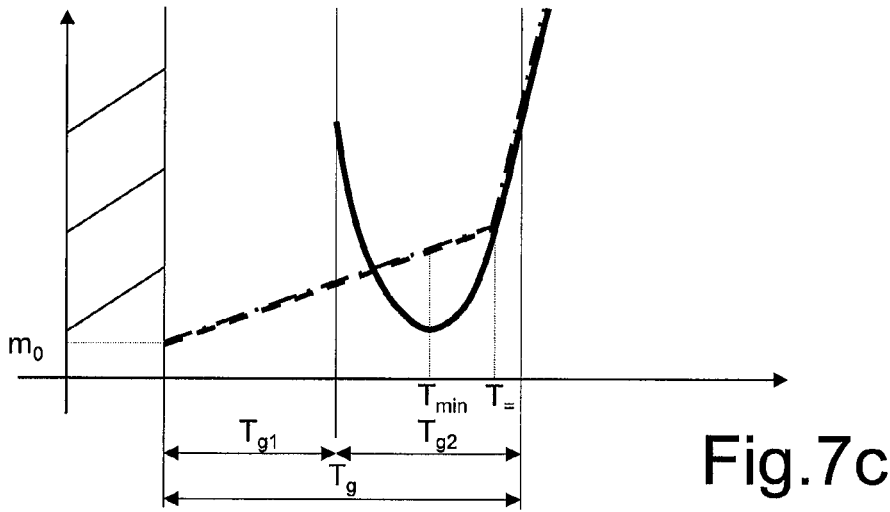

Alternatively, at the end of each active regeneration, it is possible to initialize the physical model represented by Eq. (7) in the way illustrated in FIGS. 7a, 7b and 7c.

According to this particular embodiment, the initialization step $T_g$ comprises a guard interval $T_{g1}$ and a subsequent wait interval $T_{g2}$.

During the guard interval $T_{g1}$, the electronic control unit simply validates (dashed-and-dotted line) substitutive particulate amounts $m_{subst}$ (dashed line), obtained by incrementing previously validated substitutive particulate amounts $m_{subst}$ with the substitution increase rate $\Delta_+$, starting from an initial value $m_0$ determined statistically and indicating the residual amount of particulate normally still present in the particulate filter at the end of a regeneration.

Once the guard interval $T_{g1}$ has terminated, and for the duration of a wait interval $T_{g2}$, the control unit calculates, in addition to the substitutive amounts of particulate $m_{subst}$, which continue to be validated, amounts $m_s$ of particulate (solid line), calculated on the basis of a point physical model, for example, by implementing Eq. (6), i.e., a physical model that does not require any initialization.

The calculated particulate amounts $m_s$ present an evolution decreasing in time until an instant $T_{min}$, following upon which they present an increasing evolution.

In the case where said instant $T_{min}$ follows upon the end of the wait interval $T_{g2}$ (FIG. 7a), at the instant $T_{g2}$ the control unit initializes the integral physical model, using as initial value the amount $m_s$ of particulate calculated with the point model; next, the control unit calculates the amount $m_s$ of particulate that has accumulated on the basis of the integral physical model (solid line, subsequent to the instant $T_{g2}$), and subjects it to validation in the way described previously, i.e., compares it with the validated particulate amount $m_{sv}$ for the previous calculation step.

Instead, in the case where said instant $T_{min}$ falls within the wait interval $T_{g2}$, the control unit compares the amount $m_s$ of particulate calculated at the instant $T_{min}$ with the corresponding substitutive particulate amount $m_{subst}$. In the case where the amount $m_s$ of particulate calculated at the instant $T_{min}$ is greater than the corresponding substitutive particulate amount $m_{subst}$ (FIG. 7b), the control unit validates the calculated particulate amount $m_s$ and initializes the integral physical model to said value, proceeding to calculation of validated particulate amounts $m_{sv}$ as described previously. Instead, in the case where the amount $m_s$ of particulate calculated at the instant $T_{min}$ is less than the corresponding substitutive particulate amount $m_{subst}$ (FIG. 7c), the control unit validates the substitutive particulate amount $m_{subst}$, then proceeding to validating substitutive particulate amounts $m_{subst}$ up to the instant $T_=$ in which the calculated particulate amount $m_s$ exceeds the substitutive particulate amount $m_{subst}$. Said calculated particulate amount $m_s$ is hence assumed as initial value of the integral physical model.

From an operative standpoint, Eq. (7) is implemented by the electronic control unit on a time-discrete basis as a summation of products, the factors of which are constituted by the value of the calibration coefficient β and of the resistance resflow to the flow of the exhaust gases through the particulate filter at the current calculation step.

Finally, in Eq. (7), the resistance resflow to the flow of the exhaust gases through the particulate filter is defined as the ratio between the counterpressure ΔP of the particulate filter and the volume flowrate $Q_v$ of the exhaust gases through the particulate filter, whilst the calibration coefficient β is determined experimentally. In greater detail, the calibration coefficient β is mapped as a function of the amount of particulate that has accumulated in the particulate filter and of the motor-vehicle driving profile (city traffic, out-of-town traffic, motorway traffic, etc.), the latter being determined on the basis of the speed of the motor vehicle, the gear engaged and the engine running conditions and load, and being then corrected as a function of the temperature $T_{GAS}$ and the volume flowrate $Q_v$ of the exhaust gases, as well as of the amount of ashes of the lubricating oil that have accumulated in the particulate filter (which reduce the useful volume of the particulate filter as if there had accumulated a further amount of particulate, with consequent variation of the counterpressure) according to experimental criteria.

Figure 8:
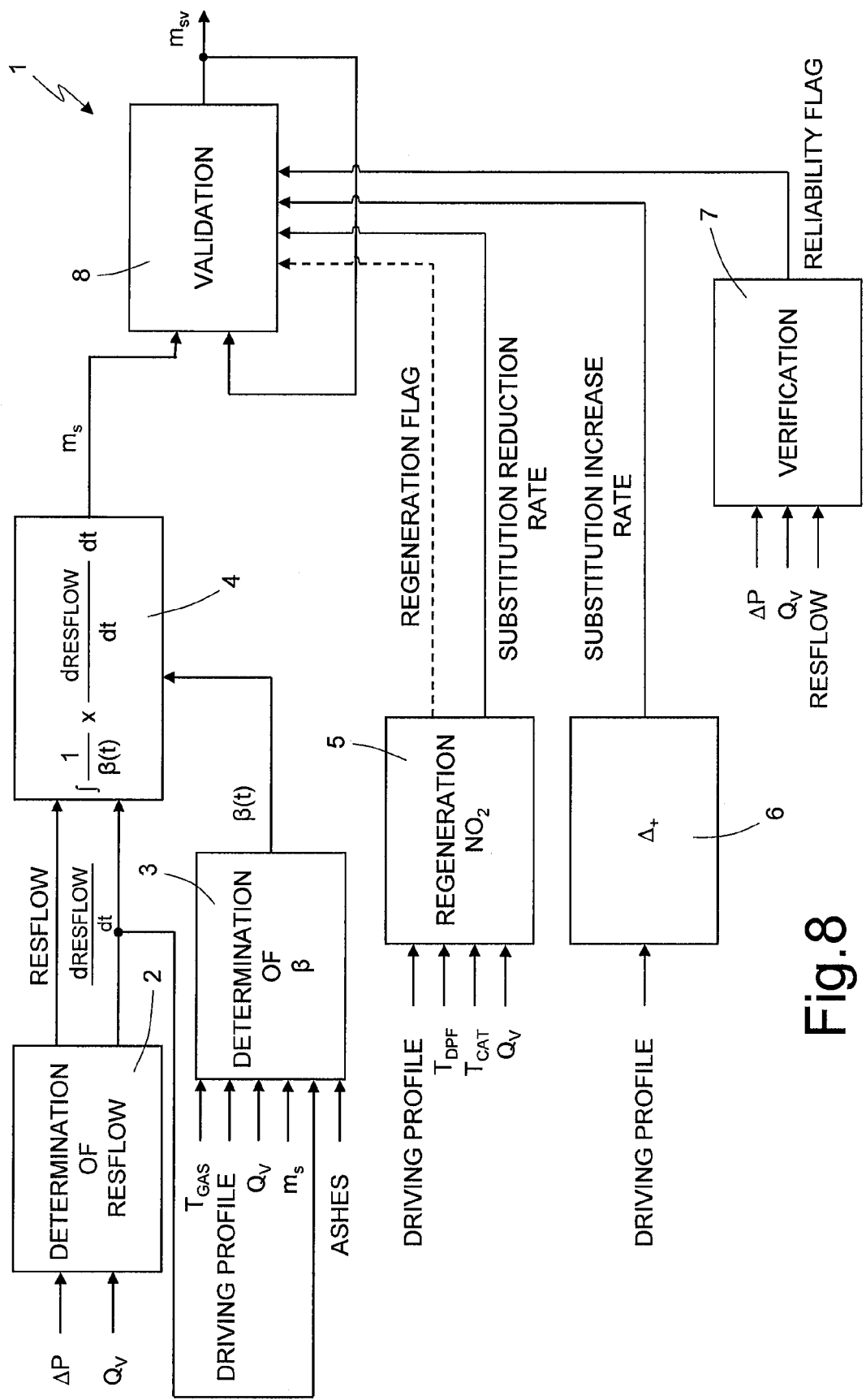
FIGS. 8 and 9 show functional block diagrams of the operations performed by an electronic control unit for the implementation of the present method.

To implement what has been described above, the electronic control unit executes a software program that implements a system for determining the amount $m_s$ of particulate that has accumulated in the particulate filter, the block diagram of which is illustrated in FIG. 8.

In particular, the determination system, designated as a whole by 1, comprises:

a block 2 for determining the resistance resflow to the flow of the exhaust gases through the particulate filter, which receives at input the counterpressure ΔP of the particulate filter and the volume flowrate $Q_v$ of the exhaust gases through the particulate filter, and supplies at output the resistance resflow, calculated as ratio between these two quantities, and the time derivative of the resistance resflow itself;

a block 3 for determining the calibration coefficient β, which receives at input the temperature $T_{GAS}$, the volume flowrate $Q_v$ of the exhaust gases that traverse the particulate filter, the motor-vehicle driving profile, the amount of particulate, i.e., the estimate validated at the previous step, the amount of ashes of the lubricating oil accumulated in the particulate filter, and the derivative of the resistance resflow, and supplies at output the value of the calibration coefficient β;

a block 4 for calculation of the amount $m_s$ of particulate that has accumulated in the particulate filter, which receives at input the resistance resflow and the time derivative of the resistance resflow calculated by block 2, and the calibration coefficient β calculated by block 3, and supplies at output the amount $m_s$ of particulate that has accumulated in the particulate filter, calculated on the basis of the physical model defined by Eq. (7);

a block 5 for detection of spontaneous regenerations, which determines, on the basis of the driving profile, or else by means of a physical model based upon the temperature of the particulate filter and of the catalytic converter, the volume flowrate $Q_v$ and/or the nitrogen oxides produced, the presence of possible spontaneous regenerations, supplying at output a flag indicating said regenerations; in addition, block 5 determines the substitution reduction rate, typically by means of calibration.

a block 6 for storage of substitution increase rates, which receives at input the motor-vehicle driving profile and supplies at output a corresponding substitution increase rate;

a block 7 for checking the existence of the operating conditions that cause the quantities measured/determined, such as the counterpressure ΔP of the particulate filter, and the volume flowrate $Q_v$ and the resistance resflow to the flow of the exhaust gases through the particulate filter, on the basis of which the amount $m_s$ of particulate that has accumulated in the particulate filter is calculated, to be reliable, which receives at input said measured/determined quantities, compares them with respective reliability thresholds and supplies at output a flag indicating said reliability; and a validation block 8, which receives at input the amount $m_s$ of particulate that has accumulated in the particulate filter supplied by block 4, the flag indicating the presence of spontaneous regenerations and the substitution reduction rate supplied by block 5, a flag (not shown in FIG. 8) indicating the activation of an active regeneration (this being a condition known to the electronic control unit because controlled by the same one), the flag of reliability supplied by block 7, the substitution increase rate supplied by block 6, and the amount $m_{sv}$ of particulate validated by block 8 itself at the previous calculation step (represented in FIG. 8 via the connection between the output and the input of block 8 itself), and supplies at output the amount of particulate validated at the current calculation step, implementing the validation method described previously.

Figure 9:
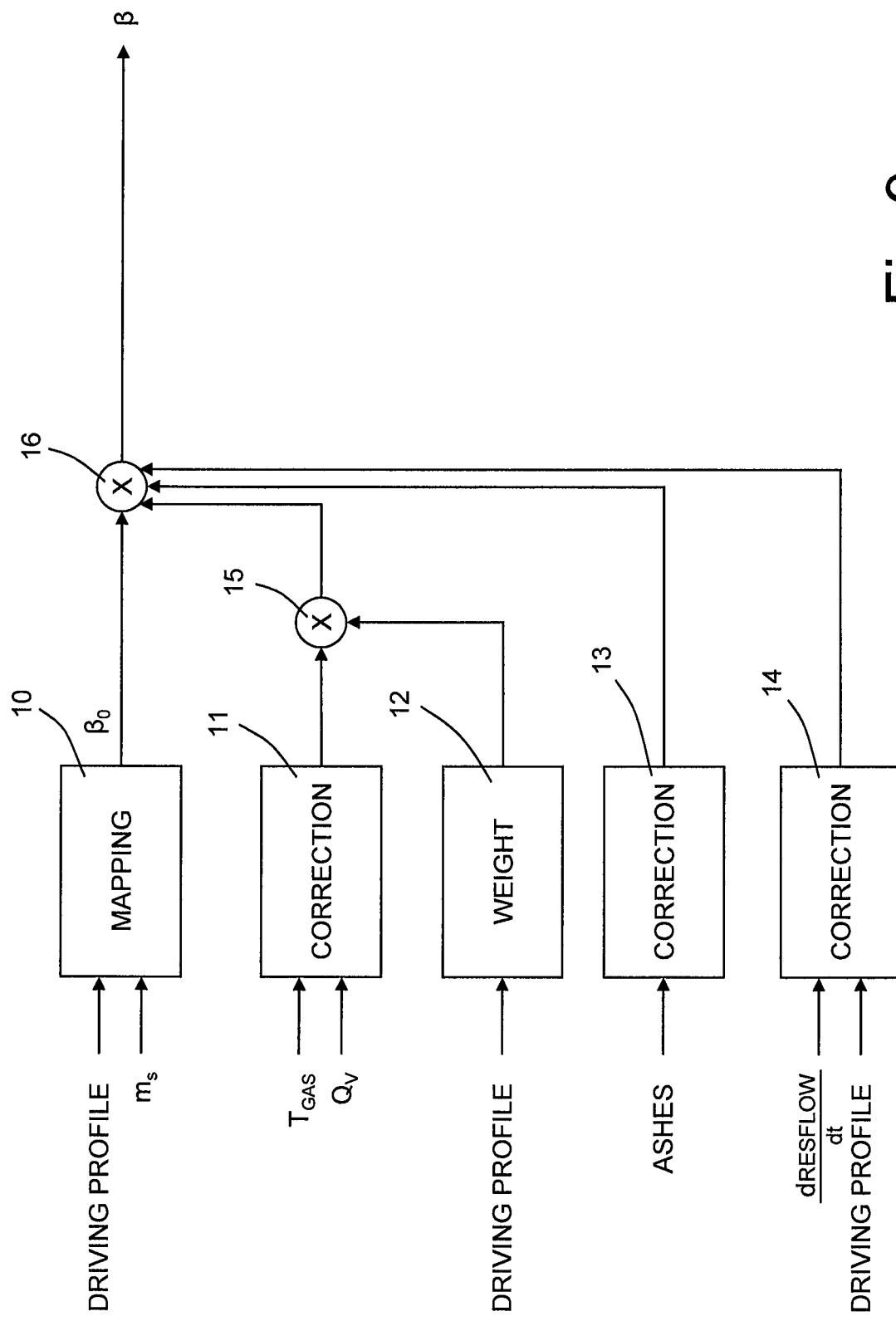

As shown in FIG. 9, block 3 for determining the calibration coefficient β in turn comprises:

a mapping block 10, which calculates, by means of mapping tables, a first estimate $β_0$ of the calibration coefficient β, on the basis of the driving profile and of the calculated particulate amount $m_s$;

a first correction block 11, which calculates, on the basis of the temperature $T_{gas}$ and of the volume flowrate $Q_v$ of the exhaust gases, a first corrective coefficient;

a weight block 12, which calculates, on the basis of the driving profile, a weight coefficient, designed to weigh the first corrective coefficient;

a second correction block 13, which calculates a second corrective coefficient, which is a function of the amount of ashes of lubricating oil that have accumulated in the particulate filter;

a third correction block 14, which calculates a third corrective coefficient as a function of the derivative of the resistance resflow and of the driving profile;

a first multiplier block 15, designed to multiply the first corrective coefficient by the weight coefficient so as to obtain a fourth corrective coefficient; and a second multiplier block 16, designed to multiply the first estimate $β_0$ of the calibration coefficient β by the second, third and fourth corrective coefficients so as to obtain the calibration coefficient β.

Figure 10:
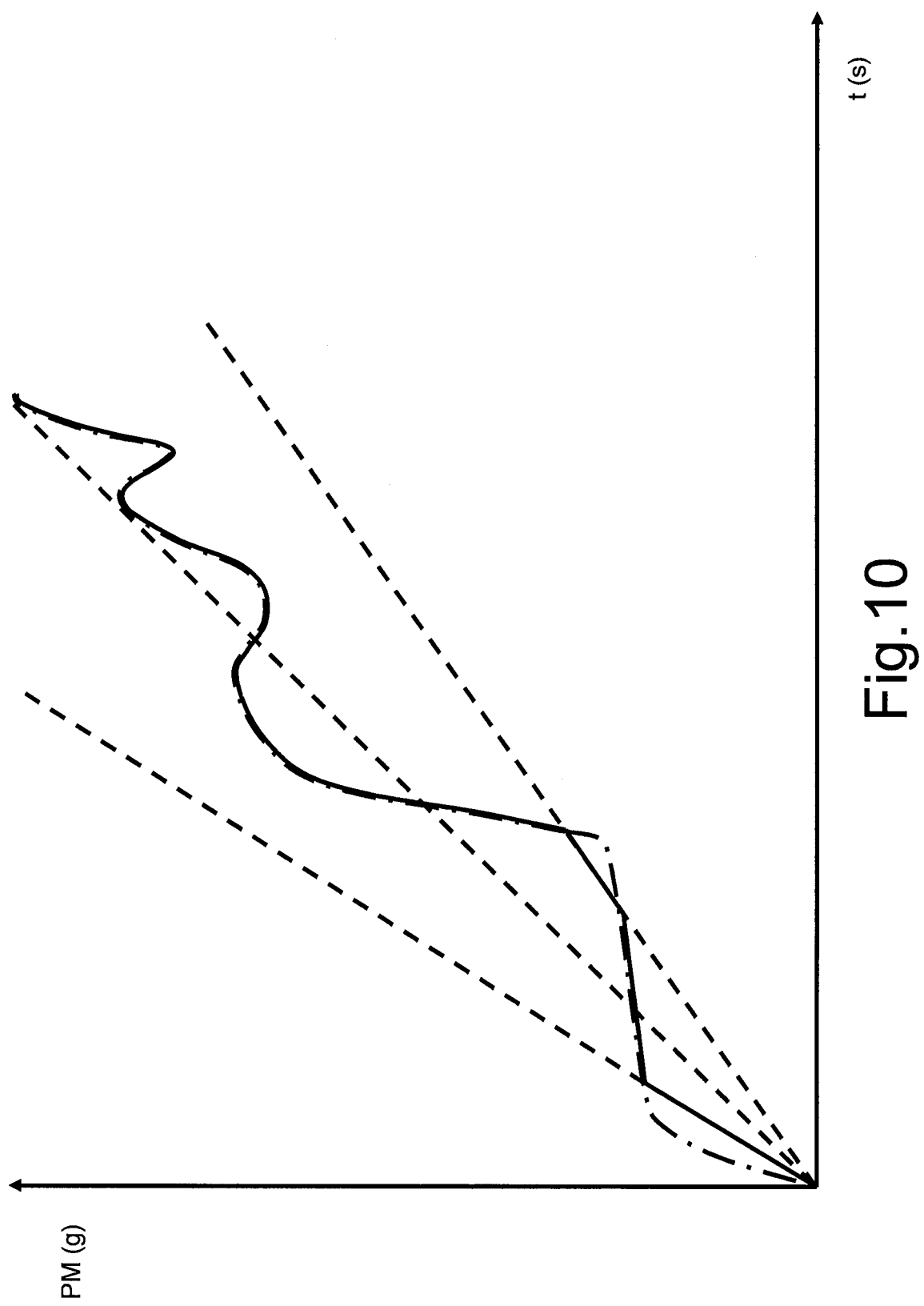

In an advantageous embodiment (see FIG. 10), the validated particulate amounts $m_{sv}$ supplied by block 8 are subjected to a further validation step implementing a threshold-check mechanism of the type described in the aforesaid European patent EP 1541829 filed in the name of the present applicant; i.e., they are further compared with corresponding minimum and maximum values, which define a corresponding range of admissibility and are obtained on the basis of the estimates supplied by a statistical model. In the case where said validated particulate amount $m_{sv}$ falls within the corresponding range of admissibility, this amount of particulate is definitively validated; otherwise, it is limited to the aforementioned maximum or minimum values in the cases where the validated particulate amount exceeds the maximum value or is less than the minimum value, respectively.

Finally, it is evident that modifications and variations may be made to the present invention, without thereby departing from the scope of the present invention, as defined in the annexed claims.

For example, the amount $m_s$ of particulate that has accumulated in the particulate filter could be calculated, instead of on the basis of Eq. (7), also on the basis of one of Eqs. (3), (5) and (6), even though, as has been said previously, the combination of the validation method described above with Eq. (7) enables better results to be obtained in terms of reliability and precision of the determination of the amount of particulate that has accumulated in the particulate filter.

In addition, the reliability of the measurement of the counterpressure ΔP of the particulate filter, and of the volume flowrate $Q_v$ of the exhaust gases through the particulate filter, as well as of the calculation of the resistance resflow to the flow of the exhaust gases through the particulate filter, could be verified in a way different from the one described previously.

Finally, the calibration coefficient β could be calculated in a way different from what has been described previously, for example, in the way described in the aforesaid European patent EP 1333165 filed in the name of the present applicant.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for determining an amount of particulate that has accumulated in a particulate filter, comprising:
    calculating the amount of particulate that has accumulated in the particulate filter on the basis of a physical model that uses at least one of a measured physical quantity and a determined physical quantity; and
    subjecting the calculated particulate amount to validation on the basis of given validation criteria, the validation criteria comprising that operating conditions occur, which cause the aforesaid at least one of the measured physical quantity and the determined physical quantity on the basis of which the amount of particulate that has accumulated in the particulate filter is calculated to be reliable;
    wherein subjecting the calculated particulate amount to validation comprises:
        validating the calculated particulate amount in the case where said criteria are satisfied; and
        validating a different amount in the case where said criteria are not satisfied;
    wherein validating a different amount comprises:
        calculating a substitutive particulate amount, which is a function of a previously validated amount and of a rate of variation, the rate of variation being a substitution reduction rate when there exist operating conditions that could give rise to a spontaneous regeneration of the particulate filter;
    wherein calculating the substitutive particulate amount comprises incrementing the previously validated amount on the basis of the substitution increase rate if there exist operating conditions that cause the aforesaid measured physical quantities on the basis of which the amount of particulate that has accumulated in the particulate filter is calculated to be considered unreliable.

2. The method according to claim 1, wherein the validation criteria include that during the accumulation of the particulate in the particulate filter, the calculated particulate amount is greater than or equal to the previously validated amount.

3. The method according to claim 1, wherein the validation criteria further include that during the accumulation of the particulate in the particulate filter, the calculated particulate amount is less than the previously validated amount, when there exist operating conditions that could give rise to a spontaneous regeneration of the particulate filter.

4. The method according to claim 1, wherein the particulate filter is part of a system for post-treatment of exhaust gases of a motor vehicle, wherein the substitution increase rates are a function of a motor-vehicle driving profile.

5. A method for determining an amount of particulate that has accumulated in a particulate filter, comprising:
    calculating the amount of particulate that has accumulated in the particulate filter on the basis of a physical model that uses at least one of a measured physical quantity and a determined physical quantity; and subjecting the calculated particulate amount to validation on the basis of given validation criteria, the validation criteria comprising that operating conditions occur, which cause the aforesaid at least one of the measured physical quantity and the determined physical quantity on the basis of which the amount of particulate that has accumulated in the particulate filter is calculated to be reliable, the measured physical quantities comprising a counterpressure of the particulate filter and a volume flowrate of exhaust gases through the particulate filter, and the validation criteria comprising that the counterpressure of the particulate filter and the volume flowrate of exhaust gases through the particulate filter satisfy respective relations with corresponding reliability thresholds;

wherein subjecting the calculated particulate amount to validation comprises:
   validating the calculated particulate amount in the case where said criteria are satisfied; and
   validating a different amount in the case where said criteria are not satisfied;
   wherein validating a different amount comprises:
      calculating a substitutive particulate amount, which is a function of a previously validated amount and of a rate of variation.

6. The method according to claim 5, wherein the respective relations are defined by the fact that the corresponding measured physical quantity is greater than or equal to the respective reliability threshold.

7. A method for determining an amount of particulate that has accumulated in a particulate filter, comprising:
   calculating the amount of particulate that has accumulated in the particulate filter on the basis of a physical model that uses at least one of a measured physical quantity and a determined physical quantity; and
   subjecting the calculated particulate amount to validation on the basis of given validation criteria, the validation criteria comprising that operating conditions occur, which cause the aforesaid at least one of the measured physical quantity and the determined physical quantity on the basis of which the amount of particulate that has accumulated in the particulate filter is calculated to be reliable, the determined physical quantities comprising a resistance to the flow of the exhaust gases through the particulate filter, and the validation criteria comprising that the resistance to the flow of the exhaust gases through the particulate filter satisfies a respective relation with a corresponding reliability threshold;
   wherein subjecting the calculated particulate amount to validation comprises:
      validating the calculated particulate amount in the case where said criteria are satisfied; and
      validating a different amount in the case where said criteria are not satisfied;
      wherein validating a different amount comprises:
         calculating a substitutive particulate amount, which is a function of a previously validated amount and of a rate of variation.

8. The method according to claim 7, wherein the aforesaid relations are defined by the fact that the corresponding determined physical quantity is greater than or equal to the respective reliability threshold.

9. A method for determining an amount of particulate that has accumulated in a particulate filter, comprising:
   calculating the amount of particulate that has accumulated in the particulate filter on the basis of a physical model that uses at least one of a measured physical quantity and a determined physical quantity; and
   subjecting the calculated particulate amount to validation on the basis of given validation criteria, the validation criteria including that during the accumulation of the particulate in the particulate filter, the calculated particulate amount is less than a previously validated amount, when there exist operating conditions that could give rise to a spontaneous regeneration of the particulate filter, and the validation criteria further including that a rate of reduction due to the spontaneous regeneration of the calculated particulate amount with respect to the previously validated amount is not higher than a given reduction thresholds;
   wherein subjecting the calculated particulate amount to validation comprises:
      validating the calculated particulate amount in the case where said criteria are satisfied; and
      validating a different amount in the case where said criteria are not satisfied;
      wherein validating a different amount comprises:
         calculating a substitutive particulate amount, which is a function of a previously validated amount and of a rate of variation.

10. The method of claim 9, wherein the validation criteria further include that the calculated particulate amount returns to being greater than or equal to the previously validated amount after being less than the previously validated amount with the reduction rate higher than the reduction threshold and in the presence of the operating conditions that could have given rise to the spontaneous regeneration of the particulate filter.

11. A method for determining an amount of particulate that has accumulated in a particulate filter, comprising: calculating the amount of particulate that has accumulated in the particulate filter on the basis of a physical model that uses at least one of a measured physical quantity and a determined physical quantity; and subjecting the calculated particulate amount to validation on the basis of given validation criteria, the validation criteria comprising that operating conditions occur, which cause the aforesaid at least one of the measured physical quantity and the determined physical quantity on the basis of which the amount of particulate that has accumulated in the particulate filter is calculated to be reliable; wherein subjecting the calculated particulate amount to validation comprises: validating the calculated particulate amount in the case where said criteria are satisfied; and validating a different amount in the case where said criteria are not satisfied; wherein validating a different amount comprises: calculating a substitutive particulate amount, which is a function of a previously validated amount and of a rate of variation, the rate of variation being a substitution reduction rate when there exist operating conditions that could give rise to a spontaneous regeneration of the particulate filter;
   wherein calculating the substitutive particulate amount comprises incrementing the previously validated amount on the basis of the substitution increase rate if during the accumulation of the particulate in the particulate filter, the calculated particulate amount is less than the previously validated amount and there do not exist the operating conditions that could give rise to a spontaneous regeneration of the particulate filter.

12. The method according to claim 11, wherein the validation criteria include that during the accumulation of the particulate in the particulate filter, the calculated particulate amount is greater than or equal to the previously validated amount.

13. The method according to claim 11, wherein the validation criteria further include that during the accumulation of the particulate in the particulate filter, the calculated particulate amount is less than the previously validated amount, when there exist operating conditions that could give rise to a spontaneous regeneration of the particulate filter.

14. The method according to claim 11, wherein the particulate filter is part of a system for post-treatment of exhaust gases of a motor vehicle, wherein the substitution increase rates are a function of a motor-vehicle driving profile.

15. A method for determining an amount of particulate that has accumulated in a particulate filter, comprising:
   calculating the amount of particulate that has accumulated in the particulate filter on the basis of a physical model that uses at least one of a measured physical quantity and a determined physical quantity; and
   subjecting the calculated particulate amount to validation on the basis of given validation criteria, the validation criteria comprising that operating conditions occur, which cause the aforesaid at least one of the measured physical quantity and the determined physical quantity on the basis of which the amount of particulate that has accumulated in the particulate filter is calculated to be reliable;
   wherein subjecting the calculated particulate amount to validation comprises:
      validating the calculated particulate amount in the case where said criteria are satisfied; and
      validating a different amount in the case where said criteria are not satisfied;
      wherein validating a different amount comprises:
         calculating a substitutive particulate amount, which is a function of a previously validated amount and of a rate of variation;
         wherein calculating the substitutive particulate amount comprises reducing the previously validated amount on the basis of a substitution reduction rate less than a reduction rate calculated if during the accumulation of the particulate in the particulate filter, the calculated particulate amount is reduced with respect to the previously validated amount by a reduction rate higher than a reduction threshold and there exist the operating conditions that could give rise to a spontaneous regeneration of the particulate filter.

16. The method according to claim 15 wherein the particulate filter is part of a system for post-treatment of the exhaust gases of a motor vehicle and the substitution reduction rate is a function of a motor-vehicle driving profile, a temperature of the particulate filter, a volume flowrate of exhaust gases through the particulate filter, and a temperature of the catalytic converter.

17. A method for determining an amount of particulate that has accumulated in a particulate filter, comprising:
   calculating the amount of particulate that has accumulated in the particulate filter on the basis of a physical model that uses at least one of a measured physical quantity and a determined physical quantity; and
   subjecting the calculated particulate amount to validation on the basis of given validation criteria, the validation criteria including that during the accumulation of the particulate in the particulate filter, the calculated particulate amount is less than a previously validated amount, when there exist operating conditions that could give rise to a spontaneous regeneration of the particulate filter, and the validation criteria further including that the calculated particulate amount returns to being greater than or equal to the previously validated amount after being less than the previously validated amount and in the absence of the operating conditions that could have given rise to the spontaneous regeneration of the particulate filter;
   wherein subjecting the calculated particulate amount to validation comprises:
      validating the calculated particulate amount in the case where said criteria are satisfied; and
      validating a different amount in the case where said criteria are not satisfied;
      wherein validating a different amount comprises:
         calculating a substitutive particulate amount, which is a function of a previously validated amount and of a rate of variation.

18. A method for determining an amount of particulate that has accumulated in a particulate filter, comprising:
   calculating the amount of particulate that has accumulated in the particulate filter on the basis of a physical model that uses at least one of a measured physical quantity and a determined physical quantity; and
   subjecting the calculated particulate amount to validation on the basis of given validation criteria;
   wherein subjecting the calculated particulate amount to validation comprises:
      validating the calculated particulate amount in the case where said criteria are satisfied; and
      validating a different amount in the case where said criteria are not satisfied;
      wherein validating a different amount comprises:
         calculating a substitutive particulate amount, which is a function of a previously validated amount and of a rate of variation;
         wherein calculating the substitutive particulate amount further comprises incrementing an initial residual amount on the basis of a substitution increase rate after an active regeneration of the particulate filter and a new accumulation of the particulate in the particulate filter.

19. The method according to claim 18, wherein the validation criteria further include that at the start of the new accumulation of the particulate in the particulate filter subsequent to the active regeneration of the particulate filter, the calculated particulate amount becomes greater than or equal to the previously validated amount.

20. A method for determining an amount of particulate that has accumulated in a particulate filter, comprising:
   calculating the amount of particulate that has accumulated in the particulate filter on the basis of a physical model that uses at least one of a measured physical quantity and a determined physical quantity; and
   subjecting the calculated particulate amount to validation on the basis of given validation criteria;
   wherein subjecting the calculated particulate amount to validation comprises:
      validating the calculated particulate amount in the case where said criteria are satisfied; and
      validating a different amount in the case where said criteria are not satisfied;
      wherein validating a different amount comprises:
         calculating a substitutive particulate amount, which is a function of a previously validated amount and of a rate of variation; and
   wherein the particulate filter is part of a system of post-treatment of exhaust gases of a motor vehicle, wherein the amount of particulate that has accumulated in the particulate filter is calculated on the basis of the following equation:

$$m_s = \int \frac{1}{\beta(t)} \cdot \frac{\partial}{\partial t} resflow \cdot dt$$

where:
resflow is the resistance to a flow of exhaust gases through the particulate filter and depends upon a counterpressure of the particulate filter and a volume flowrate of the exhaust gases through the particulate filter, and $\beta(t)$ is a calibration coefficient indicating at least one of a variation of a spatial distribution of the particulate inside the particulate filter and a variation of physico-chemical properties of the particulate itself as a function of engine operating conditions of the motor vehicle and of a history of accumulation of the particulate in the particulate filter.

21. The method according to claim 20, wherein the calibration coefficient is calculated on the basis of an empirical model that describes the spatial distribution of the particulate that has accumulated inside the particulate filter as a function of the motor-vehicle driving profile, the volume flowrate and a temperature of the exhaust gases through the particulate filter, a mass of particulate that has accumulated in the particulate filter, a derivative of the resistance to the flow of the exhaust gases through the particulate filter, and an amount of ashes of oil that has accumulated in the particulate filter.

22. A system for post-treatment of exhaust gases comprising:
a particulate filter; and
an electronic-control system configured to determine an amount of particulate that has accumulated in the particulate filter, the electronic-control system being configured to:
calculate the amount of particulate that has accumulated in the particulate filter on the basis of a physical model that uses at least one of a measured physical quantity and a determined physical quantity; and
subject the calculated particulate amount to validation on the basis of given validation criteria where the calculated particulate amount is validated when the validation criteria are satisfied and a substitutive particulate amount is validated when the validation criteria are not satisfied, the validation criteria comprising that operating conditions occur, which cause the aforesaid at least one of the measured physical quantity and the determined physical quantity on the basis of which the amount of particulate that has accumulated in the particulate filter is calculated to be reliable, and the substitutive particulate amount being calculated by a function of a previously validated amount and of a rate of variation, the rate of variation being a substitution reduction rate when there exist operating conditions that could give rise to a spontaneous regeneration of the particulate filter, and wherein calculating the substitutive particulate amount comprises incrementing the previously validated amount on the basis of the substitution increase rate if there exist operating conditions that cause the aforesaid measured physical quantities on the basis of which the amount of particulate that has accumulated in the particulate filter is calculated to be considered unreliable.

23. A system for discharge of exhaust gases for an internal-combustion engine, the discharge system comprising a system for post-treatment of the exhaust gases, comprising:
a particulate filter; and
an electronic-control system configured to determine an amount of particulate that has accumulated in the particulate filter and to activate regeneration thereof when given conditions arise, the electronic-control system having:
an airflow meter for measuring a flowrate of air taken in by the internal-combustion engine;
a pressure sensor for measuring a counterpressure of the particulate filter; and
an electronic control unit connected to the airflow meter and to the pressure sensor and configured to determine an amount of particulate that has accumulated in the particulate filter, the electronic-control system being configured to:
calculate the amount of particulate that has accumulated in the particulate filter on the basis of a physical model that uses at least one of a measured physical quantity and a determined physical quantity; and
subject the calculated particulate amount to validation on the basis of given validation criteria where the calculated particulate amount is validated when the validation criteria are satisfied and a substitutive particulate amount is validated when the validation criteria are not satisfied, the validation criteria comprising that operating conditions occur, which cause the aforesaid at least one of the measured physical quantity and the determined physical quantity on the basis of which the amount of particulate that has accumulated in the particulate filter is calculated to be reliable, and the substitutive particulate amount being calculated by a function of a previously validated amount and of a rate of variation, the rate of variation being a substitution reduction rate when there exist operating conditions that could give rise to a spontaneous regeneration of the particulate filter, and wherein calculating the substitutive particulate amount comprises incrementing the previously validated amount on the basis of the substitution increase rate if there exist operating conditions that cause the aforesaid measured physical quantities on the basis of which the amount of particulate that has accumulated in the particulate filter is calculated to be considered unreliable.

24. A system for post-treatment of exhaust gases comprising: a particulate filter; and an electronic-control system configured to determine an amount of particulate that has accumulated in the particulate filter, the electronic-control system being configured to: calculate the amount of particulate that has accumulated in the particulate filter on the basis of a physical model that uses at least one of a measured physical quantity and a determined physical quantity; and subject the calculated particulate amount to validation on the basis of given validation criteria where the calculated particulate amount is validated when the validation criteria are satisfied and a substitutive particulate amount is validated when the validation criteria are not satisfied, the validation criteria comprising that operating conditions occur, which cause the aforesaid at least one of the measured physical quantity and the determined physical quantity on the basis of which the amount of particulate that has accumulated in the particulate filter is calculated to be reliable, and the substitutive particulate amount being calculated by a function of a previously validated amount and of a rate of variation, the rate of variation being a substitution reduction rate when there exist operating conditions that could give rise to a spontaneous regeneration of the particulate filter, and wherein calculating the substitutive particulate amount comprises incrementing the previously validated amount on the basis of the substitution increase rate if during the accumulation of the particulate in the particulate filter, the calculated particulate amount is less than the previously validated amount and there do not exist the operating conditions that could give rise to a spontaneous regeneration of the particulate filter.

25. A system for discharge of exhaust gases for an internal combustion engine, the discharge system comprising a system for post-treatment of the exhaust gases, comprising: a particulate filter; and an electronic-control system configured to determine an amount of particulate that has accumulated in the particulate filter and to activate regeneration thereof when given conditions arise, the electronic-control system having: an airflow meter for measuring a flowrate of air taken in by the internal combustion engine; a pressure sensor for measuring a counter pressure of the particulate filter; and an electronic control unit connected to the airflow meter and to the pressure sensor and configured to determine an amount of particulate that has accumulated in the particulate filter, the electronic-control system being configured to: calculate the amount of particulate that has accumulated in the particulate filter on the basis of a physical model that uses at least one of a measured physical quantity and a determined physical quantity; and subject the calculated particulate amount to validation on the basis of given validation criteria where the calculated particulate amount is validated when the validation criteria are satisfied and a substitutive particulate amount is validated when the validation criteria are not satisfied, the validation criteria comprising that operating conditions occur, which cause the aforesaid at least one of the measured physical quantity and the determined physical quantity on the basis of which the amount of particulate that has accumulated in the particulate filter is calculated to be reliable, and the substitutive particulate amount being calculated by a function of a previously validated amount and of a rate of variation, the rate of variation being a substitution reduction rate when there exist operating conditions that could give rise to a spontaneous regeneration of the particulate filter, and wherein calculating the substitutive particulate amount comprises incrementing the previously validated amount on the basis of the substitution increase rate if during the accumulation of the particulate in the particulate filter, the calculated particulate amount is less than the previously validated amount and there do not exist the operating conditions that could give rise to a spontaneous regeneration of the particulate filter.

* * * * *